United States Patent [19]
Ihara et al.

[11] Patent Number: 6,066,831
[45] Date of Patent: May 23, 2000

[54] ARC START ANCILLARY APPARATUS

[75] Inventors: Hideki Ihara, Takarazuka; Tetsu Innami, Osaka; Jing Bo Wang, Amagasaki, all of Japan

[73] Assignee: Matsushita Electric Industrial Co., Ltd., Japan

[21] Appl. No.: 09/128,418

[22] Filed: Aug. 4, 1998

[30] Foreign Application Priority Data

Aug. 6, 1997 [JP] Japan .................................... 9-211073

[51] Int. Cl.$^7$ ................................................. B23K 9/067
[52] U.S. Cl. ............................... 219/130.4; 219/130.21; 219/130.5
[58] Field of Search ........................... 219/130.4, 130.21, 219/130.5, 137 PS

[56] References Cited

U.S. PATENT DOCUMENTS

| | | |
|---|---|---|
| 4,618,760 | 10/1986 | Murch et al. ......................... 219/130.4 |
| 4,672,175 | 6/1987 | Niven ..................................... 219/130.4 |
| 5,264,679 | 11/1993 | Martin . |
| 5,773,792 | 6/1998 | Hagiwara et al. .................... 219/130.4 |
| 5,852,278 | 12/1998 | Tanaka et al. ........................ 219/130.4 |

OTHER PUBLICATIONS

Patent Abstracts of Japan, vol. 096,No. 012, Dec. 26, 1996.

*Primary Examiner*—Clifford C. Shaw
*Attorney, Agent, or Firm*—Parkhurst & Wendel, L.L.P.

[57] ABSTRACT

In an arc start ancillary apparatus, which is connected in parallel to a welding power source for supplying electric power necessary for arc discharge between an electrode and a base metal, for supplying a pulsed electric current in transferring from spark discharge to arc discharge, an object of the present invention is to solve a problem in that arc is not started, and to keep the effective value of current low. A capacitor with a relatively high capacitance is connected to secure a current for transferring from spark discharge to arc discharge, and a D.C. high voltage of a high voltage generator is applied according to a pulse in a period to which the period of pulse signals of a fixed period type high voltage controller is set so that the effective value of the current between an electrode and a base metal is kept low.

4 Claims, 6 Drawing Sheets

ARC START ANCILLARY APPARATUS

FIELD OF THE INVENTION

The present invention relates to an arc start ancillary apparatus for an arc welding machine.

BACKGROUND OF THE INVENTION

A conventional, publicly known arc start ancillary apparatus for an arc welding machine has been disclosed in Japanese Patent Application Laid-Open No. 8-215843.

Figure 6:
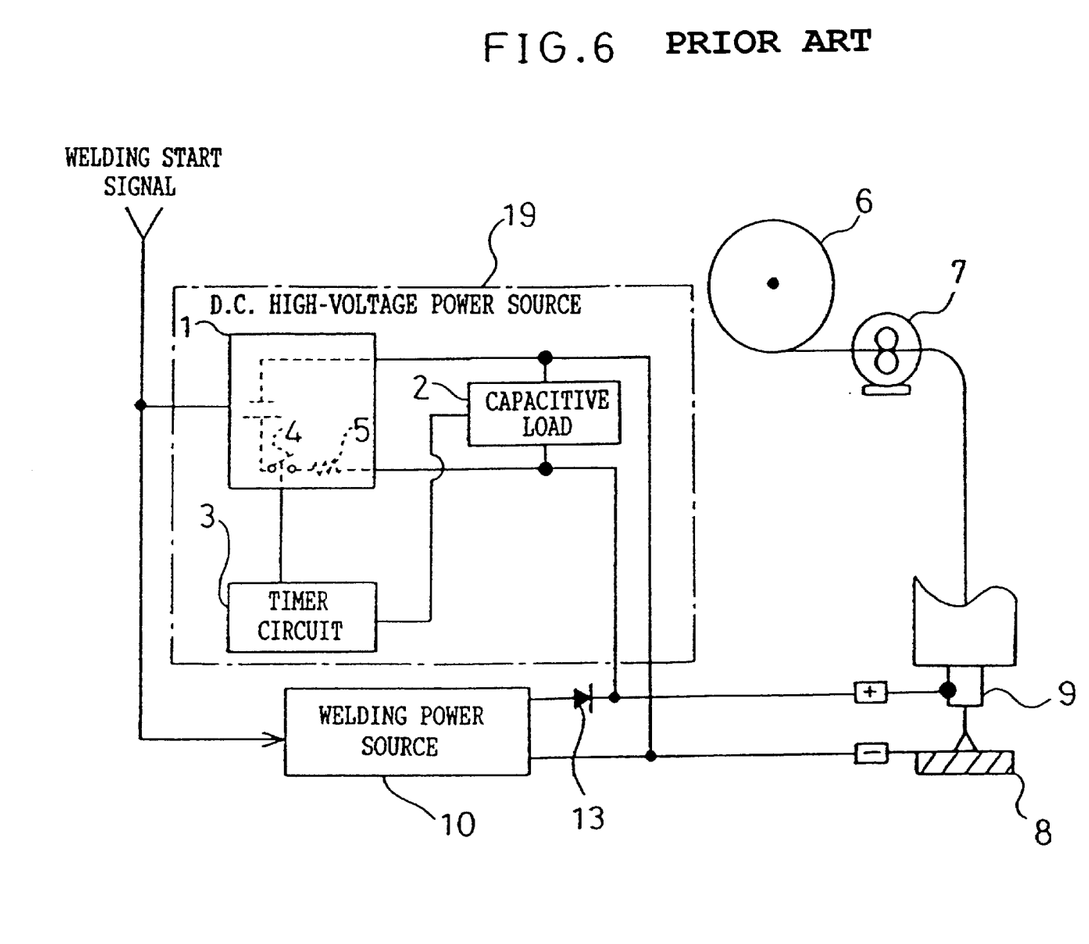
FIG. 6 is a schematic view of a conventional arc welding machine.

As shown in FIG. 6, a conventional arc welding machine is made up of an arc start ancillary apparatus 19, a welding power source 10, a wire 6, a wire feeding motor 7, a base metal 8, and an electrode 9.

This arc welding machine is configured so that welding current is supplied to between the electrode 9 and the base metal 8 by means of the low-voltage welding power source 10 on receipt of a welding start signal, and thereby the wire feeding motor 7 is driven feed the wire 6 to a weld location, by which arc welding is performed.

At the time of arc start, spark discharge is generated between the base metal 8 and the electrode 9 by applying a pulsed D.C. high voltage, so that an insulating substance (for example, slug) at the tip end of the wire is destroyed by an electric shock of the generated spark discharge, or an arc is induced by the creeping discharge on the insulating substance on the base metal 8.

Thereby, the arc start performance is improved, and the safety is secured by restricting the effective value of current caused to flow at the time of discharge by the application of the pulse-form D.C. high voltage.

The conventional arc start ancillary apparatus 19 is made up of a D.C. high-voltage power source 1 for generating spark discharge, a capacitive load 2 for checking whether discharge is generated between the electrode 9 and the base metal 8, a timer circuit 3 for turning on/off the D.C. high-voltage power source 1 with a fixed period, a switch 4, and a drooping resistor 5.

The following operation is repeated: A D.C. high voltage is applied by the D.C. high-voltage power source 1 according to the input of a welding start signal, the current of spark discharge at the time when spark discharge is generated is detected by the capacitive load 2, the switch 4 of the D.C. high-voltage power source 1 is turned off according to the timer circuit 3, and the switch 4 of the D.C. high-voltage power source 1 is turned on again after an elapse of certain time.

Pulsing the D.C. high voltage of the D.C. high-voltage power source 1 is an effective way to decrease the effective value of current flow by discharging.

However, there arises a problem in that the current in transferring from spark discharge sometimes to arc discharge cannot sometimes be secured, so that arc is not started.

Also, although the aforesaid current can sometimes be secured by the floating capacitance by a cable or the like, the aforesaid current cannot be secured depending on the laying condition of cable.

Also, although the capacitive load 2 is provided in the conventional arc start ancillary apparatus 19, this capacitive load 2 serves to detect discharge, but is not intended to improve the arc start performance.

SUMMARY OF THE INVENTION

An object of the present invention is to provide an arc start ancillary apparatus which improves the arc start performance for transferring from spark discharge to arc discharge, and keeps the effective value of current low by applying a pulsed D.C. high voltage.

The arc start ancillary apparatus in accordance with the present invention is configured so that a capacitor with a relatively high capacitance is connected to secure a current for transferring from spark discharge to arc discharge, and a pulsed D.C. high voltage is applied to keep the effective value of the current low.

According to the present invention, the problem where the arc is not started is solved, and the effective value of current can be kept low by the improvement in arc start performance and the application of D.C. high voltage.

The present invention provides an arc start ancillary apparatus, which is connected in parallel to a welding power source for supplying electric power necessary for arc discharge between an electrode and a base metal, for supplying a pulsed electric current in transferring from spark discharge to arc discharge, comprises: a high voltage generator for executing the generation and stoppage of a D.C. high voltage pulse signals; having a set period a capacitor connected in parallel to the output of the high voltage generator; and a controller for generating the pulse signals, wherein the period of pulse signals from the controller is set so that the effective value of current between the electrode and the base metal is kept low. This apparatus can decrease the effective value of current by the improvement in arc start performance and the application of D.C. high voltage.

Also, the present invention provides an arc start ancillary apparatus, which is connected in parallel to a welding power source for supplying electric power necessary for arc discharge between an electrode and a base metal, for supplying a pulsed electric current in transferring from spark discharge to arc discharge, comprises: an arc detector for detecting a welding current; a disconnector for cutting off and stopping pulse signals according to the welding current value of the arc detector; a high voltage generator for executing the generation and stoppage of a D.C. high voltage in accordance with with the period of pulse signals from a controller; a capacitor connected in parallel to the output of the high voltage generator; and a controller for generating the pulse signals, wherein the period of pulse signals from the controller is set so that the effective value of current between the electrode and the base metal is kept low. This apparatus can decrease the effective value of current by the improvement in arc start performance and the application of D.C. high voltage, and also can stop the output by cutting off the pulse signals by means of the disconnector when a welding current is detected by the arc detector.

Further, the present invention provides an arc start ancillary apparatus, which is connected in parallel to a welding power source for supplying electric power necessary for arc discharge between an electrode and a base metal, for supplying a pulsed electric current in transferring from spark discharge to arc discharge, comprises: a high voltage generator for executing the generation and stoppage of a D.C. high voltage pulse signals; having a set period a capacitor connected in parallel to the output of the high voltage generator; an effective current value detector, which is connected in series to the plus side of the output of the high voltage generator, for detecting and outputting the effective value of a current supplied to the electrode in transferring from spark discharge to arc discharge; and a variable duty type high voltage controller for changing the duty of the pulse and outputting pulse signals according to a welding start signal, wherein the pulse duty is changed and set by feeding back the period of pulse signals generated from the variable duty type high voltage controller to the same controller so that the effective value of the current between the electrode and the base metal is kept low. This apparatus can improve the arc start performance by adding the discharge current of the capacitor to the output current of the high voltage generator.

Also, when the effective value of current of D.C. high voltage exceeds the specified value at the effective current value detector, the effective value of current can be decreased by feeding back the change in pulse duty to the variable duty type high voltage controller so that the effective value of current does not exceed the specified value.

More specifically, the apparatus is characterized in that when the capacitance of the capacitor is about $3 \times 2.35 \times 10^3$ pF, the frequency of pulse signals is 1.5 Hz or near that value.

As described above, according to the arc start ancillary apparatus in accordance with the present invention, the capacitor with a relatively high capacitance is connected, and the period of application and stoppage of D.C. high voltage is set by the controller. Thereby, sufficient electric charges are supplied when spark discharge is generated, so that the current for transferring to arc discharge can be supplied, and also the effective value of the current can be kept low and decreased to a safe value.

Therefore, the problem in where an arc is not started can be solved, and the arc start performance can be improved.

Also, specifically, the period of application and stoppage of D.C. high voltage is made about 1.5 Hz by connecting the capacitor with a capacitance of $3 \times 2.35 \times 10^3$ pF, by which sufficient electric charges are supplied when spark discharge is generated, so that the current for transferring to arc discharge can be supplied, the arc start performance can be improved, and the effective value of current can be kept low.

DESCRIPTION OF THE EMBODIMENTS

The arc start ancillary apparatus in accordance with the present invention will now be described with reference to specific embodiments.

A specific example in which the arc start ancillary apparatus in accordance with a first embodiment of the present invention is applied to a consumable electrode type arc welding machine is explained below.

Figure 1:
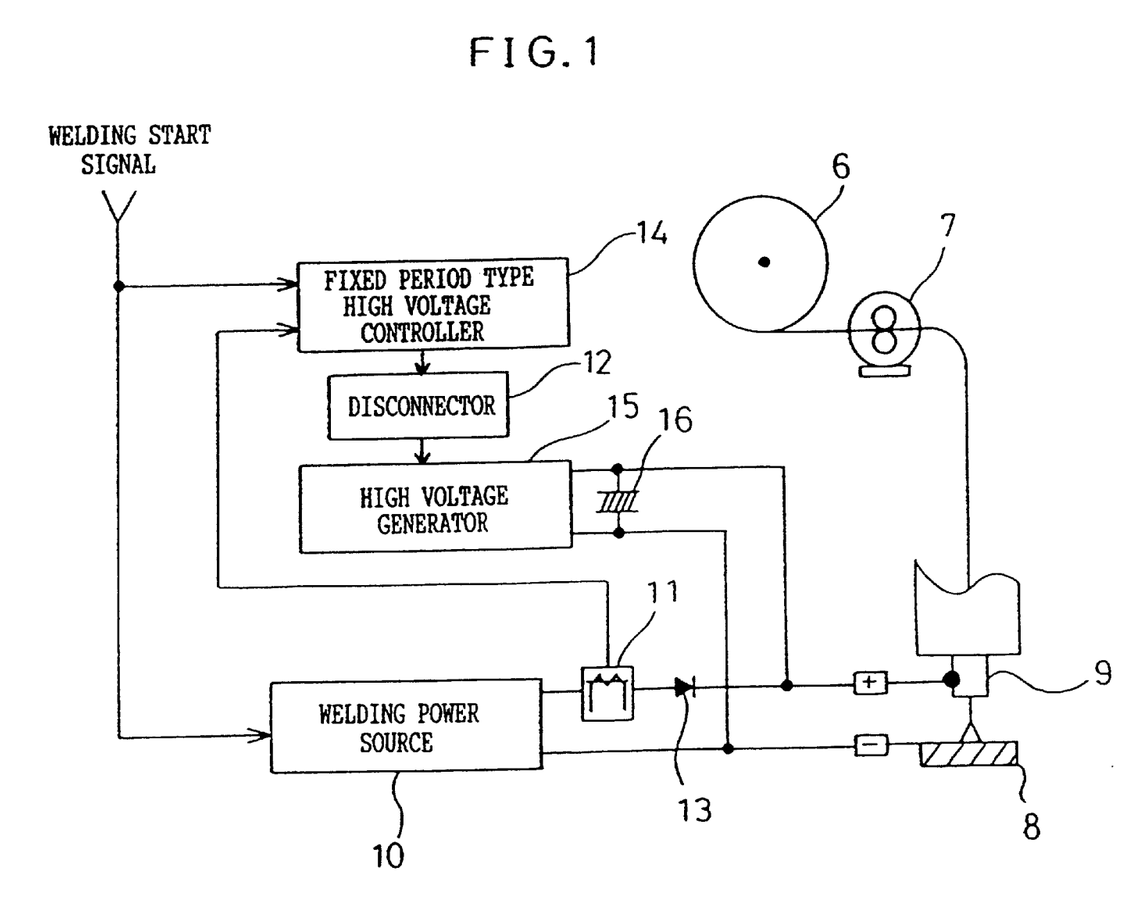
FIG. 1 is a schematic view of a consumable electrode type arc welding machine in accordance with a first embodiment of the present invention.

As shown in FIG. 1, a consumable electrode type arc welding machine is so configured that welding current is supplied between an electrode 9 and a base metal 8 by means of a low-voltage welding power source 10 on receipt of a welding start signal, and thereby a wire feeding motor 7 is driven to feed a wire 6 to a weld location, by which arc welding is performed.

An arc start ancillary apparatus of the first embodiment of the present invention is, as shown in FIG. 1, made up of an arc detector 11, a disconnector 12, a high voltage generator 15, a capacitor 16, and a controller, for example, a fixed period type high voltage controller 14.

In transferring from spark discharge to arc discharge at the time of arc start, the fixed period type high voltage controller 14 on receipt of a welding start signal generates pulse signals with a fixed period to the high voltage generator 15 via the disconnector 12.

The high voltage generator 15 executes the generation and stoppage of D.C. high voltage in accordance with with the period of the aforesaid pulse signals, so that a high voltage is supplied to between the electrode 9 and the base metal 8.

By the capacitor 16 connected in parallel to the output of the high voltage generator 15, the current caused by the discharge of the capacitor 16 is added to the output current of the high voltage generator 15, by which the transfer from spark discharge to arc discharge is facilitated to improve the arc start performance.

Figure 4:
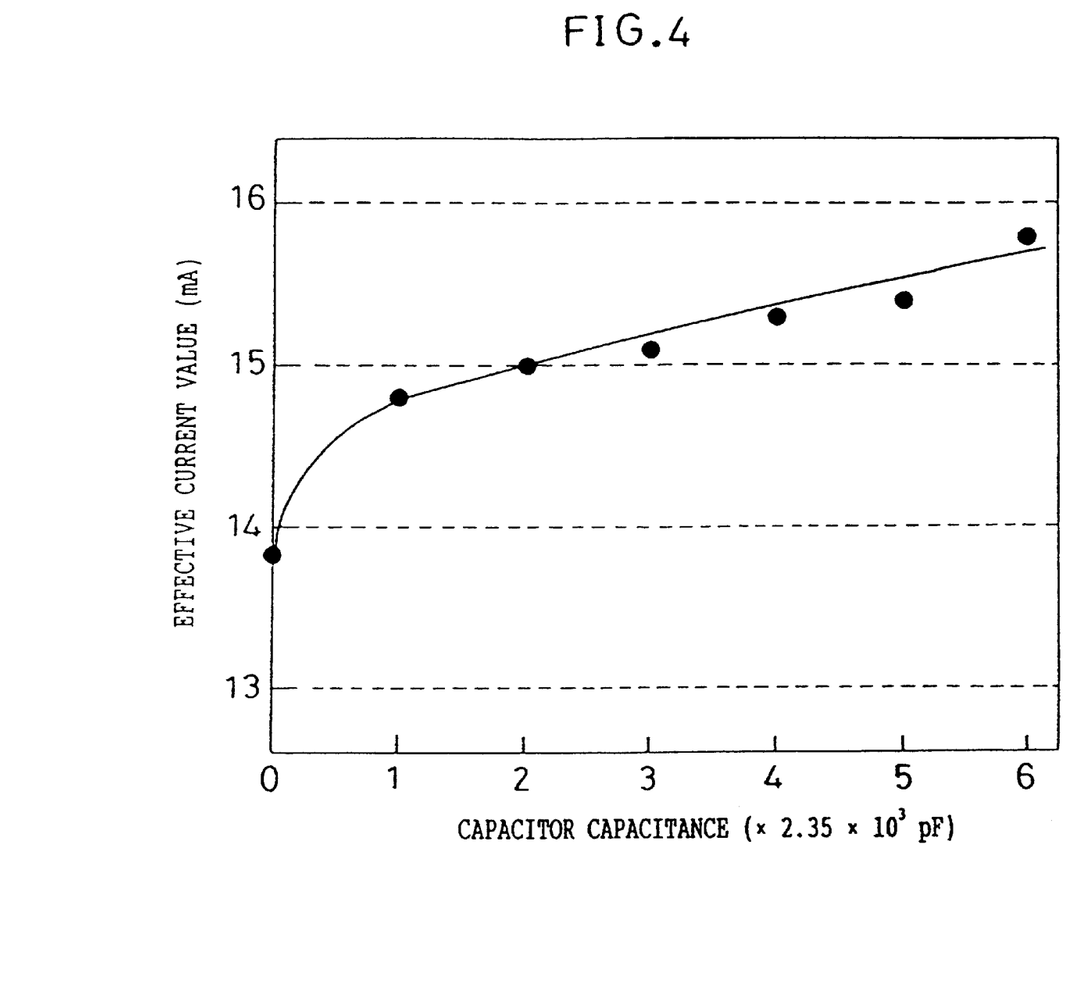
FIG. 4 is a characteristic diagram showing the relationship between capacitor capacitance and effective current value in accordance with the first embodiment of the present invention.

The addition of the current caused by the discharge of the capacitor 16 increases the effective value of current. For the change of the effective value of current with respect to the change in capacitor capacitance at the time of continuous application of D.C. high voltage, as can be seen in FIG. 4, the effective value of current increases with an increase in the capacitor capacitance. The data in this figure are those in the case where discharge is generated via a resistance estimated for a human body, 500 Ω, in the condition that the cable length is 25 m, the spark gap is 0.5 mm, and the discharge atmosphere is air.

For example, when the capacitor capacitance is $1 \times 2.35 \times 10^3$ pF, the effective value of current is about 14.8 mA, and when the capacitor capacitance is $6 \times 2.35 \times 10^3$ pF, the effective value of current is about 15.8 mA, increasing by about 1 mA.

However, the effective value of current can be kept low by selecting the period of application and stoppage of D.C. high voltage of the fixed period type high voltage controller 14.

Figure 5:
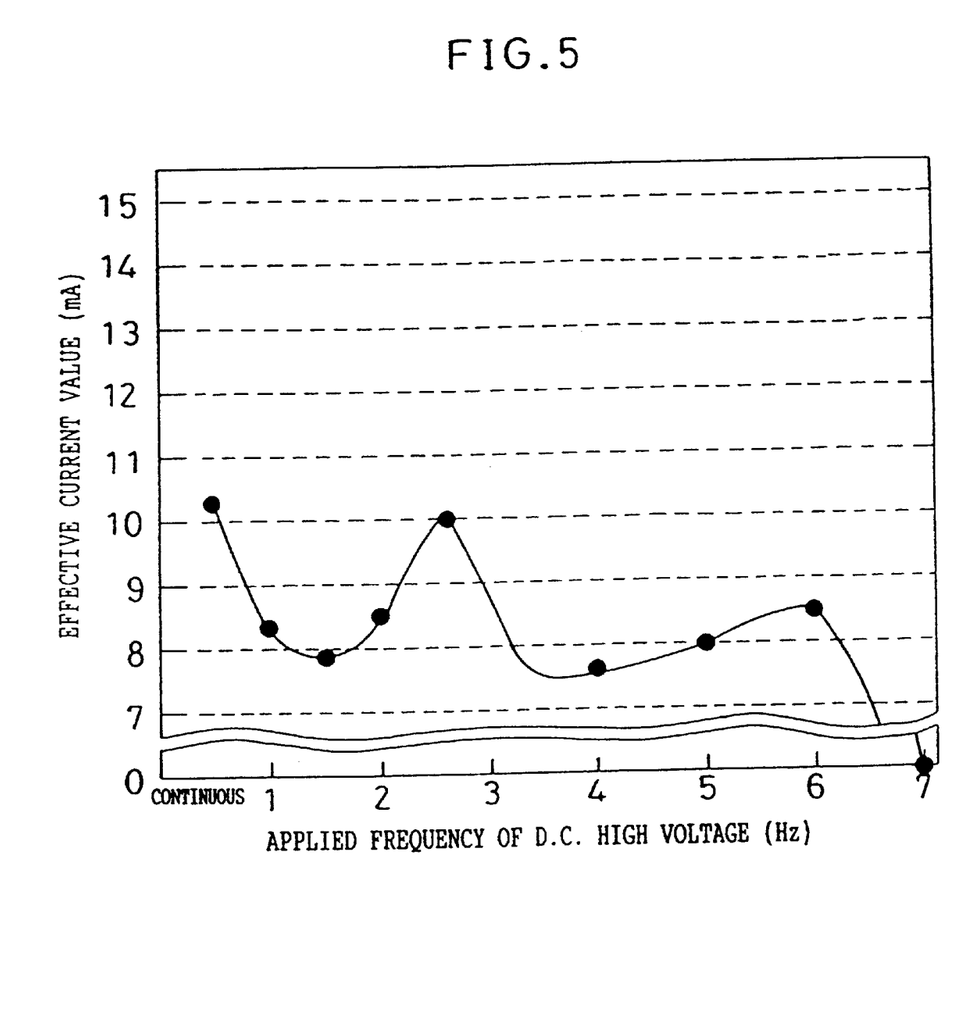
FIG. 5 is a characteristic diagram showing the relationship between applied frequency and effective current value in accordance with the first embodiment of the present invention.

For example, for the relationship between the applied frequency of D.C. high voltage and the effective value of current in the case where a capacitor capacitance of $3 \times 2.35 \times 10^3$ pF is connected, as can be seen in FIG. 5, the effective value of current fluctuates with the change in the applied frequency of D.C. high voltage. The data in this figure, too, are those in the case where discharge is generated via a resistance estimated for a human body, 500 Ω, in the condition that the cable length is 25 m, the spark gap is 0.5 mm, and the discharge atmosphere is air, and also in the condition of a high voltage application duty of 50%.

The increase/decrease in the effective value of current depends on the applied frequency of D.C. high voltage and the times of discharge, and when the applied frequency and the times of discharge agree with each other, the effective value of current is the lowest.

However, if the applied frequency of D.C. high voltage is too high, the voltage of spark discharge cannot be reached, so that an applied frequency of D.C. high voltage in the vicinity of 1.5 Hz is selected.

The effective value of current in the vicinity of the selected 1.5 Hz is about 8 mA, which meets the requirement of the IEC Standard and other standards.

It is to be noted that when the welding current is detected by the arc detector 11, the pulse signals are cut off by the disconnector 12, so that the output is stopped.

Also, the apparatus is configured so that D.C. high voltage is not applied to the low-voltage portion of the welding power source and the like by using a diode 13.

Thus, the capacitor 16 with a relatively high capacitance is connected, and the period of application and stoppage of D.C. high voltage is set by the fixed period type high voltage controller 14. Thereby, sufficient electric charges are supplied when spark discharge is generated, so that the current for transferring to arc discharge can be supplied, and also the effective value of the current can be kept low.

When a welding current is detected by the arc detector 11, the pulse signals are cut off by the disconnector 12, so that the output is stopped.

Also, even when the capacitor has a capacitance other than about $3 \times 2.35 \times 10^3$ pF in the first embodiment, the same effect can be achieved by setting the frequency of pulse signals which keep the effective value of current low.

Also, although the case where the arc start ancillary apparatus in accordance with the present invention is applied to the consumable electrode type arc welding machine has been explained in the first embodiment, the same effect can be achieved when the apparatus is applied to a non-consumable electrode type arc welding machine or some other welding machines.

Figure 2:
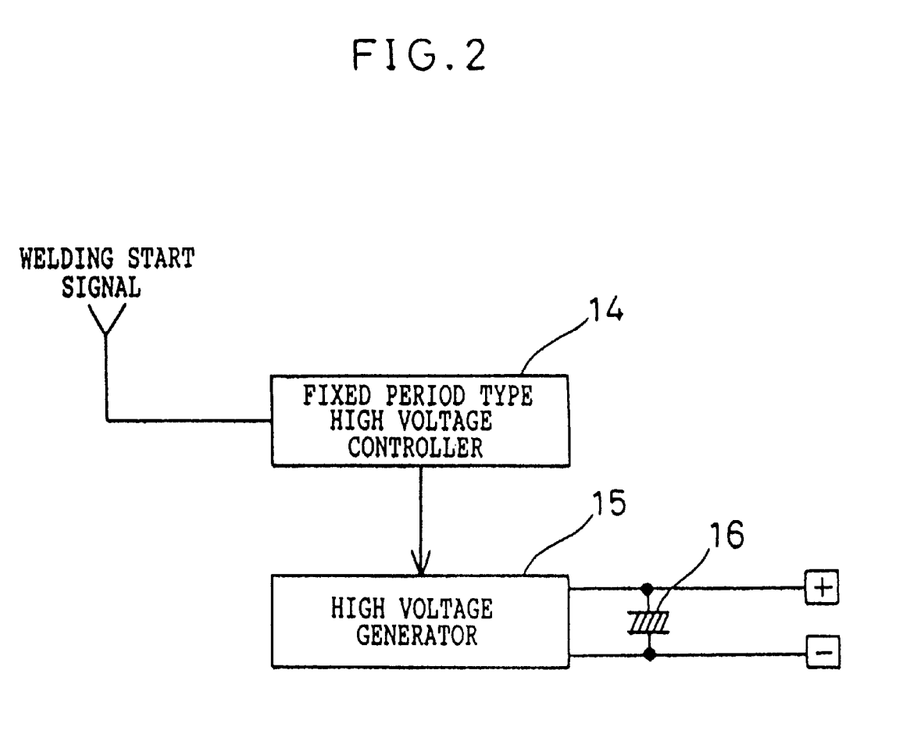
FIG. 2 is a schematic view of an arc start ancillary apparatus in accordance with a second embodiment of the present invention.

The arc start ancillary apparatus in accordance with a second embodiment of the present invention is, as shown in FIG. 2, made up of a high voltage generator 15, a capacitor 16, and a controller, for example, a fixed period type high voltage controller 14.

The fixed period type high voltage controller 14 to which a welding start signal is input generates pulse signals with a fixed period to the high voltage generator 15.

The high voltage generator 15 repeats the application and stoppage of D.C. high voltage according to the pulse signals.

By the capacitor 16 connected in parallel to the output of the high voltage generator 15, the current caused by the discharge of the capacitor 16 is added to the output current of the high voltage generator 15.

Thus, the capacitor 16 with a relatively high capacitance is connected, and the period of application and stoppage of D.C. high voltage is set by the fixed period type high voltage controller 14. Thereby, sufficient electric charges are supplied when spark discharge is generated, so that the current for transferring to arc discharge can be supplied, and also the effective value of the current can be kept low.

Figure 3:
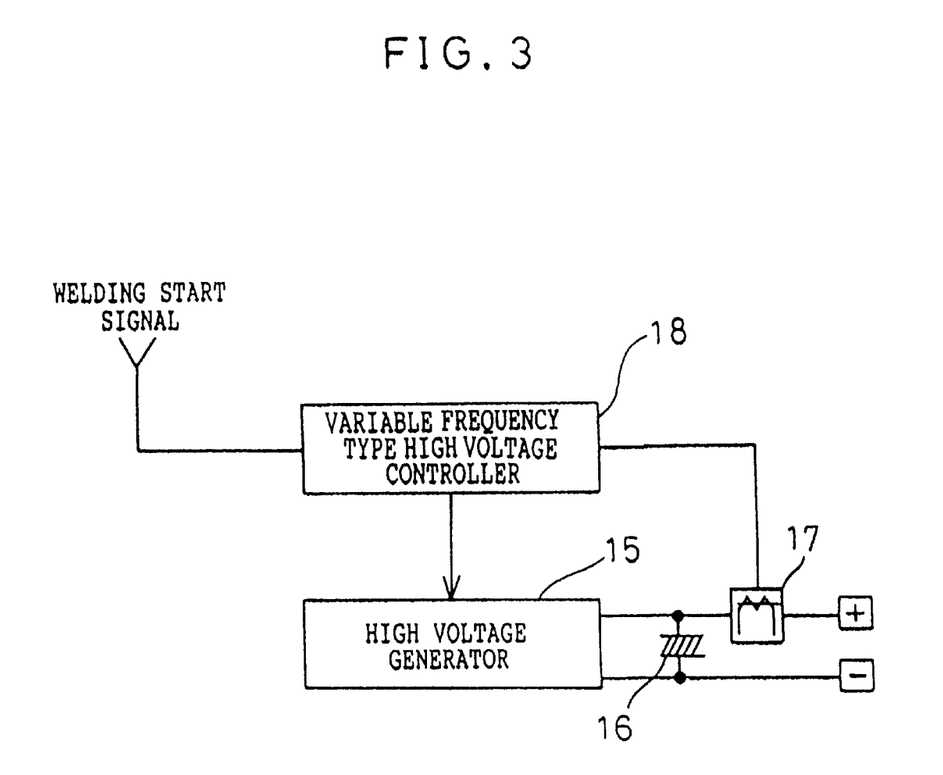
FIG. 3 is a schematic view of an arc start ancillary apparatus in accordance with a third embodiment of the present invention.

The arc start ancillary apparatus in accordance with a third embodiment of the present invention is, as shown in FIG. 3, made up of a variable or frequency type high voltage controller 18, a high voltage generator 15, a capacitor 16, and an effective current value detector 17.

The high voltage generator 15 repeats the application and stoppage of D.C. high voltage according to the pulse signals from the variable frequency type high voltage controller 18.

The capacitor 16 is connected in parallel to the output of the high voltage generator 15. Specifically, the capacitor 16 is connected to a point between the plus side of the output of the high voltage generator 15 and the effective current value detector 17 and the minus side of the output of the high voltage generator 15.

The current value is maintained by storing electric charges by using the capacitor 16 in the application of D.C. high voltage and by supplying the electric charges in transferring from spark discharge to arc discharge.

The effective current value detector 17, which is connected in series to the plus side of the output of the high voltage generator 15, detects the effective value of current of spark discharge when D.C. high voltage is applied, and outputs it to the variable frequency type high voltage controller 18.

The variable frequency type high voltage controller 18 to which a welding start signal is input starts the output of pulse signals. When the effective value of current exceeds the specified value at the effective current value detector 17, the pulse frequency is decreased, and the pulses are output so that the effective value of current does not exceed the specified value.

Thus, the capacitor 16 with a relatively high capacitance is connected, and when the effective value of current exceeds the specified value at the effective current value detector 17, the pulse frequency is decreased by the variable frequency type high voltage controller 18, and the pulses are output so that the effective value of current does not exceed the specified value. Therefore, sufficient electric charges are supplied when spark discharge is generated, so that the current for transferring to arc discharge can be supplied, and also the effective value of the current can be kept low.

What is claimed is:

1. An arc start ancillary apparatus, connected in parallel to a welding power source for supplying electric power necessary for arc discharge between an electrode and a base metal, for supplying a pulsed electric current in transferring from spark discharge to arc discharge, comprising:

a controller for generating pulse signals having a period;

a high voltage generator connected with said controller for executing generation and stoppage of D.C. high voltage pulse signals; and a capacitor connected in parallel to the output of said high voltage generator, wherein the period of said pulse signals from said controller is set so that the effective value of current between said electrode and said base metal is kept low.

2. An arc start ancillary apparatus according to claim 1, wherein when the capacitance of the capacitor is about $3 \times 2.35 \times 10^3$ pF, the frequency of pulse signals is 1.5 Hz.

3. An arc start ancillary apparatus, connected in parallel to a welding power source for supplying electric power necessary for arc discharge between an electrode and a base metal, for supplying a pulsed electric current in transferring from spark discharge to arc discharge, comprising:

an arc detector for detecting a welding current;

a controller for generating pulse signals having a period;

a disconnector connected with said controller for cutting off and stopping said pulse signals according to the welding current value of said arc detector;

a high voltage generator connected with said disconnector for executing generation and stoppage of D.C. high voltage pulse signals from said controller; and a capacitor connected in parallel to the output of said high voltage generator, wherein the period of said pulse signals from said controller is set so that the effective value of current between said electrode and said base metal is kept low.

4. An arc start ancillary apparatus, connected in parallel to a welding power source for supplying electric power necessary for arc discharge between an electrode and a base metal, for supplying a pulsed electric current in transferring from spark discharge to arc discharge, comprising:

a high voltage generator for executing generation and stoppage of D.C. high voltage pulse signals having a period;

a capacitor connected in parallel to the output of said high voltage generator;

an effective current value detector, connected in series to the plus side of the output of said high voltage generator, for detecting and outputting the effective value of a current supplied to said electrode in transferring from spark discharge to arc discharge; and a variable frequency type high voltage controller for changing the frequency of said pulse signals according to a welding start signal, wherein the pulse frequency is changed and set by feeding back the period of pulse signals generated from said variable frequency type high voltage controller to said controller so that the effective value of the current between said electrode and said base metal is kept low.

* * * * *